United States Patent Office 3,597,509
Patented Aug. 3, 1971

3,597,509
POLYETHERS CONTAINING PHOSPHORUS AND ALCOHOLIC HYDROXY GROUPS AND THEIR PRODUCTION
Hans-Eberhard Praetzel, Bensberg-Frankenforst, and Herbert Jenkner, Cologne-Deutz, Germany, assignors to Chemische Fabrik Kalk G.m.b.H., Cologne-Kalk, Germany
No Drawing. Continuation-in-part of application Ser. No. 515,165, Dec. 20, 1965. This application June 22, 1967, Ser. No. 647,961
Claims priority, application Germany, Dec. 24, 1964, C 34,742; June 23, 1966, C 39,428
Int. Cl. C07f 9/30; C08g 23/10, 33/16
U.S. Cl. 260—953
4 Claims

ABSTRACT OF THE DISCLOSURE

Process for the production of phosphorus and alcoholic hydroxy group containing polyethers by reacting (a) white phosphorus with about stoichiometric quantities of alkali metal hydroxide, aldehydes and water in the presence of alcohols and (b) after removal of the more volatile components reacting the reaction product which essentially consists of alkali metal salts of bis-(hydroxyalkane) phosphinic acid with epoxy compounds, at least 2 mol of epoxy compound being used per g.-atom of phosphorus in the reaction product and the polyethers produced thereby. According to a variation of the process the reaction product of (a) is treated with a water free mineral acid before removal of the volatile components and the free bis-(hydroxyalkane)-phosphinic acid is reacted with the epoxy compound rather than its alkali metal salt. The polyether products are useful as components of polyurethane resins.

RELATED APPLICATION

This application is a continuation-in-part of application Ser. No. 515,165, filed Dec. 20, 1965, now U.S. Pat. No. 3,468,983.

BACKGROUND OF THE INVENTION

The present invention relates to novel phosphorus and alcoholic hydroxy group containing polyethers and to and improved process for their production from starting materials which mainly consist of bis-(hydroxyalkane)phosphinic acids or their alkali metal salts.

As is known, the bis-(hydroxyalkane)-phosphinic acids can be produced by the adition of aldehydes or ketones to hypophosphorous acid. This reaction proceeds according to the following equation.

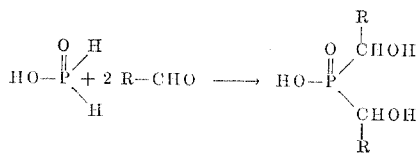

This reaction proceeds with strong evolution of heat which causes a partial disproportionation of the hypophosphorous acid to phosphine and phosphorous acid which is coupled with considerable reductions in the yields of the bis-(hydroxyalkane)-phosphinic acids.

The alkali metal salts of hypophosphorous acid are obtained by disproportionation of white phosphorus in the presence of water and alkali metal hydroxide, especially sodium or potassium hydroxide, in aqueous or alcoholic solution. This reaction can be illustrated by the following equation

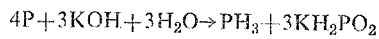

The yield of hypophosphorous acid or respectively its salt, however, is at most only 70% of theory as again disproportionation according to the following equation occurs

of

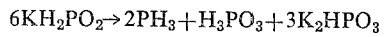

Further losses of hypophosphorous acid or respectively its salts cannot be avoided in the processing and separation of the salt mixture produced.

Therefore, high losses of phosphorus, in the form of phosphine, occur in the known procedures for the production of bis-(hydroxyalkane)-phosphinic acids, which are far beyond those of the expected theoretical quantity of phosphine. In addition, several steps were required in such known processes for the production of the bis-(hydroxyalkane)-phosphinic acids.

SUMMARY OF THE INVENTION

It is an object of the invention to provide a process for the production of a product mainly consisting of bis-(hydroxyalklane)-phosphinic acids or respectively their alkali metal salts suitable for the production of phosphorus and alcoholic hydroxy group containing polyethers which avoid the above-mentioned disadvantages.

According to the invention this object is achieved by reacting white phosphorus with an alkali metal hydroxide, water and aldehydes in the presence of alcohols and distilling off the volatile portions of the reaction mixture to provide a crude product which can be reacted at 50 to 160° C. with epoxy compounds to produce alcoholic hydroxy and phosphorus containing polyethers. For the latter reaction at least 3 mols of the epoxy compound are provided per gram atom of phosphorus contained in the crude product. According to a preferred modification of the process the crude reaction product from the reaction between the white phosphorus alkali metal hydroxide, water and aldehyde in the presence of alcohols prior to removal of the more volatile components is reacted with a strong anhydrous mineral acid to convert the alkali metal salt of the bis-(hydroxyalkane)-phosphinic acid contained therein as the main reaction product to the free acid and the free acid is reacted with at least 2 mols of the epoxy compound per g.-atom of phosphorus contained in the reaction product. This feature facilitates the removal of the volatile components (mostly the alcohol used as solvent) of the reaction product.

DETAILED DESCRIPTION OF THE INVENTION INCLUDING PREFERRED EMBODIMENTS

According to the invention it was surprisingly found that white phosphorus reacts with stoichiometric quantities of alkali metal hydroxide, water and aldehydes in the presence of alcohols to yield a quantity of non-volatile phosphorus compounds corresponding to 90% of the starting white phosphorus supplied. The remainder of the phosphorus is in part converted to phosphine. Nevertheless, the quantity of phosphine produced is considerably less than when white phosphorus is reacted with an alkali metal hydroxide and water in the absence of an aldehyde. The non-volatile products in addition to subordinate quantities of other phosphorus containing compounds, mainly are the alkali metal salts of bis-(hydroxyalkane)-phosphinic acids. The non-volatile reaction products can subsequently, preferably without purification or separation, be reacted with an epoxy compound to produce the alcoholic hydroxy group and phosphorus containing polyethers.

In carrying out the process according to the invention, the white phosphorus is first introduced into a liquid saturated alcohol, such as, for example, methanol, ethanol, propanol, isopropanol, butanol, isobutanol or a mixture of such alcohols. Then 2.0 to 4.0 mol of an aldehyde per g.-atom of phosphorus is added to such phosphorus and alcohol mixture while passing nitrogen therethrough and the resulting mixture heated to 30–75° C., preferably 45–65° C. At this temperature, a solution of 0.75–0.85 mol of alkali metal hydroxide, preferably sodium or potassium hydroxide, and water in a liquid saturated aliphatic alcohol per g.-atom of phosphorus is added to such mixture. The total quantity of alcohol supplied to the reaction mixture should amount to about 20 mol per g.-atom of phosphorus. The temperature of the reaction mixture during the reaction which proceeds with evolution of phosphine is maintained at 70–75° C., preferably 45–65° C. Unexpectedly, the quantity of phosphine produced is only 10 to 35% of the quantity which is normally produced in the production of phosphinic acid from white phosphorus. After completion of the reaction the solvent is distilled off from the reaction mixture, if desired, under reduced pressure. The residue which remains is a highly viscous mass which solidifies upon cooling down and mainly consists of the alkali metal salt of the bis(hydroxyalkane)-phosphinic acid corresponding to the alkali metal hydroxide and the aldehyde employed. The crude product is employed directly for the production of the alcoholic hydroxy group and phosphorus containing polyethers.

For this purpose, for example, the crude product can be reacted with 3 to 10 mol of epichlorohydrin per g.-atom of phosphorus contained therein. In this reaction, on one hand, the hydroxy alkane groups of the alkali metal salts of the bis-(hydroxyalkane)-phosphinic acid are etherified with the secondary alcohol groups formed by opening of the epoxy (oxirane) ring and, on the other hand, the phosphinic acid group is esterified with formation of an alkali metal chloride, to produce the alcoholic hydroxy group and phosphorus containing polyethers.

The etherification of the reaction products which primarily consist of the alkali metal salts of bis-(hydroxyalkane)-phosphinic acid can, however, also be carried out with epoxy compounds other than epichlorohydrin, such as, for example, ethylene oxide, propylene oxide, styrene oxide, epibromohydrin, glycidol. Such epoxy compounds (2 to 5 mol of) are employed per g.-atom of phosphorus in the reaction product, preferably under superatmospheric pressure up to 100 atmospheres and the reaction mixture is heated to temperatures up to 160° C. In such etherification a partial esterification of the phosphinic acid groups also takes place simultaneously. Nevertheless, the acid numbers of the polyethers thus obtained is normally still too high. As a consequence they are then normally given an after-treatment with epichlorohydrin to effect the necessary esterification, for example, by boiling the alkali metal salts of the phosphinic acid polyethers with epichlorohydrin under reflux until the acid number has been reduced to 6–3 and less, followed by distilling off the excess epichlorohydrin. It can be of advantage for the progress of the reaction to introduce a small quantity of alkali metal chloride into the reaction mixture together with the epichlorohydrin. Quantities of 0.5 to 5.0 parts by weight of alkali metal chloride per 100 parts by weight of epichlorohydrin can already suffice. The quantity suited for the special case at hand can be easily ascertained by simple preliminary tests.

Aliphatic aldehydes, such as, the lower alkanals, formaldehyde, acetaldehyde, propionaldehyde, butyraldehyde and their low molecular weight polymers or condensation products, such as, paraformaldehyde, trioxane and aldol are suitable for carrying out the process according to the invention. Formaldehyde is employed either as a solution in methanol or it is introduced into the reaction mixture in gaseous form either during the reaction or during the addition of the alkali metal hydroxide.

The alcoholic hydroxy group and phosphorus containing polyethers obtained according to the invention are colorless to light yellow viscous liquids. Their phosphorus content is about 3–13.5 weight percent, the hydroxy numbers thereof are from 60 to 400 and their acid numbers are from 6–2. Such polyethers are suited for the production of self-extinguising polyurethanes. The alcoholic hydroxy groups contained in the polyether can react with isocyanate groups with the formation of polymeric molecules in which the phosphorus is bound to the polymer chains so as to provide lasting flame-proofing action. As the phosphorus atoms in the polyethers produced according to the invention are bound to the alcoholic hydroxy groups over P—C bonds, hydrolytic cleavage of the phosphorus from the macromolecules is also practically out of the question.

The reaction product obtained by the reaction of white phosphorus with alkali metal hydroxide, water and aldehydes in the presence of alcohols must be freed from the alcohol used as solvent prior to reaction with the epoxy compound. However, when the main quantity of the alcohol has been removed from the reaction product the viscosity of the reaction product rises to such a degree that the last residues of the alcohol can only be separated off under great difficulties and with increased expenditure of energy.

In the further development of the process it was found that these difficulties could be overcome if water free strong mineral acid is first added to the reaction product in the first step (a) in a quantity about equivalent to each g.-atom of the phosphorus contained in such reaction product and then reacting the thus obtained reaction product, mainly consisting of the free bis-(hydroxyalkane)-phosphinic acid, after removal of the precipitated alkali metal salt of the mineral acid and the volatile components, with the epoxy compound at temperatures between 30 and 160° C., whereby at least 2 mols of epoxy compound are employed per g-atom of the phosphorus contained in the reaction product.

The conversion of the alkali metal salts of the bis-(hydroxyalkane)-phosphinic acid obtained in the first step (a) is effected as follows:

After the development of the phosphine ends, the reaction mixture which mainly consists of the alkali metal salt of bis-(hydroxyalkane)-phosphinic acid, is cooled to 0 to 20° C. and a strong mineral acid added thereto. Gaseous mineral acids, such as, hydrogen chloride and hydrogen bromide, are particularly suited for this purpose. However, liquid acids, such as, for example, perchloric acid, can also be used. The addition of mineral acid to the reaction mixture mainly consisting of the alkali metal salt of bis-(hydroxyalkane)-phosphinic acid is continued slowly while stirring until no further alkali metal salt of the mineral acid precipitates out. About one equivalent of acid is required for every g.-atom of phosphorus in the reaction mixture. The precipitated alkali metal salt of the mineral acid is then separated from the reaction mixture and the alcohol serving as solvent also removed, preferably, by distillation under vacuum. The reaction product remaining mainly consists of the free bis-(hydroxyalkane)-phosphinic acid. This reaction product is then directly employed for the production of the alcoholic hydroxyl group and phosphorus containing polyethers.

For this purpose at least 2 mol, preferably, 3 to 10 mol of epoxy compound per g.-atom of phosphorus contained in the reaction product are heated under reflux cooling with such product at temperatures of 30 to 160° C. Halogen free epoxy compounds, such as, for example, ethylene oxide, propylene oxide, styrene oxide, glycidol and others are especially suited for this reaction. The reaction mixture is boiled under reflux until its neutralization number (acid number) drops to 5 or below. Thereafter the volatile components are removed, preferably, by distillation under reduced pressure, whereupon the desired free alcoholic hydroxyl group and phosphorus containing polyether remains as the residue.

The free bis-(hydroxyalkane)-phosphinic acids produced according to the preferred embodiment of the invention which are produced from their alkali metal salts have a substantially lower viscosity than their alkali metal salts and thereof can be separated from the alcohol used as solvent more completely and with less expenditure of energy. Also the reaction with the epoxy compound is facilitated by the low viscosity of the bis-(hydroxyalkane)-phosphinic acid. Also, when a halogen free polyether is to be produced from the alkali metal salt of a bis-(hydroxyalkane)-phosphinic acid, thus must first be etherified with a halogen free epoxy compound and esterified by reaction with epichlorohydrin. According to the invention halogen free polyethers can be obtained by a single reaction of the free bis-(hydroxyalkane)-phosphinic acid with a halogen free epoxy compound.

The process according to the invention is illustrated in the following examples but such process is not limited thereto. In such examples the proportions are given in parts by weight unless specified otherwise.

EXAMPLE 1

225 parts of paraformaldehyde were added to:

(a) 93 parts of white phosphorus under 840 parts of methanol and the reaction vessel rinsed with nitrogen. The mixture was then heated to about 55° C. and 93.8 parts of NaOH dissolved in 42.4 parts of $H_2O$ and 810 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours and after cooling it was filtered to remove the slight clouding thereof. The methanol was removed from the filtrate by distillation which towards the end was carried out under vacuum. A tough mass which solidified on cooling remained as the residue. The yield was 406 parts of a crude product with a 21 weight percent of phosphorus. Therefore 92.5 weight percent of the phosphorus supplied had been converted to non-volatile compounds.

(b) 37 parts of this crude product which primarily consisted of the sodium salt of bis-(hydroxymethane)-phosphinic acid were then directly reacted with 116 parts of epichlorohydrin by boiling under reflux while stirring. Sodium chloride separated out during the course of this reaction. After the reaction was completed the sodium chloride was filtered off and the filtrate obtained cooled down. The excess of epichlorohydrin was then distilled off from the filtrate under reduced pressure. 112 parts of a viscous light yellow polyether product remained as the residue. Such product contained 20.3 weight percent of chlorine, 8.6 weight percent of phosphorus and had a hydroxy number of 264 and an acid number of 3. About 2.9 mol of epichlorohydrin had reacted per g.-atom of phosphorus supplied.

EXAMPLE 2

225 parts of paraformaldehyde were added to:

(a) 93 parts of white phosphorus under 840 parts of methanol and the reaction vessel rinsed with nitrogen. The mixture was then heated to about 55° C. and 132 parts of KOH dissolved in 42.4 parts of $H_2O$ and 830 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours and after cooling it was filtered to remove the slight clouding thereof. The methanol was removed from the filtrate by distillation which towards the end was carried out under vacuum. A tough mass which solidified on cooling remained as the residue. The yield was 406 parts of a crude product with a 19.0 weight percent of phosphorus. Therefore 91.5 weight percent of the phosphorus supplied had been converted to non-volatile compounds.

(b) 328 parts of this crude product which primarily consisted of the potassium salt of bis-(hydroxymethane)-phosphinic acid were then directly reacted with 127 parts of propylene oxide for 2½ hours at 120° C. while shaking. 451 parts of a water clear, viscous liquid with a phosphorus content of 12.9 weight percent were obtained. This product was again reacted with 110 parts of propylene oxide under the same conditions. 564 parts of a water clear, viscous liquid with a phosphorus content of 11.1 weight percent were obtained. The reaction product was then heated while stirring under reflux with 250 parts of epichlorohydrin. Potassium chloride separated out and after the reaction was completed the potassium chloride was filtered off and the filtrate obtained cooled down. The excess of epichlorohydrin was then distilled off from the filtrate under reduced pressure. 460 parts of a viscous light yellow polyether product remained as the residue. Such product contained 3.8 weight percent of chlorine, 10.8 weight percent of phosphorus and had a hydroxy number of 348 and an acid number of 4.

EXAMPLE 3

36 parts of paraformaldehyde were added to:

(a) 14.9 parts of white phosphorus under 160 parts of methanol and the reaction vessel rinsed with nitrogen. The mixture was then heated to about 55° C. and 15 parts of NaOH dissolved in 6.8 parts of $H_2O$ and 145 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours and after cooling it was filtered to remove the slight clouding thereof. The methanol was removed from the filtrate by distillation which towards the end was carried out under vacuum.

(b) The crude product obtained which primarily consisted of the sodium salt of bis-(hydroxymethane)-phosphinic acid was then directly reacted with 240 parts of styrene oxide under reflux while stirring. After completion of the reaction the excess styrene oxide was distilled off. 228 parts of a viscous product with a phosphorus content of 6.5 weight percent remained as the residue. About 2.56 mol of styrene oxide reacted per g.-atom of phosphorus supplied. The reaction product was then heated under reflux while stirring with 70 parts of epichlorohydrin. Sodium chloride separated off during the course of the reaction. After the reaction was completed the sodium chloride was filtered off and the filtrate obtained cooled down. The excess of epichlorohydrin was then distilled off from the filtrate under reduced pressure. 228 parts of a viscous light yellow polyether product remained as the residue. Such product contained 2.0 weight percent of chlorine, 5.3 weight percent of phosphorus and had a hydroxy number of 250 and an acid number of 2.5. About 1.25 mol of epichlorohydrin had reacted per g.-atom of phosphorus supplied.

EXAMPLE 4

86.52 parts of butyraldehyde were added to:

(a) 14.9 parts of white phosphorus under 160 parts of methanol and the reaction vessel rinsed with nitrogen. The mixture was then heated to 50° C. and 15 parts of NaOH dissolved in 6.8 parts of $H_2O$ and 155 parts of methanol added thereto slowly while continuously stirring. During the reaction a mixture of nitrogen and phosphine escaped. The reaction solution was maintained at 50° C. for 3 further hours and the methanol and excess butyraldehyde then distilled off, towards the end under vacuum. 97 parts of reaction product remained as a tough viscous mass.

(b) 97 parts of the crude product which primarily consisted of the sodium salt of bis-(hydroxybutane)-phosphinic acid was then directly reacted with 185 parts of epichlorohydrin while stirring under reflux. During the course of the reaction NaCl separated out. After the reaction was completed the sodium chloride was filtered off and the filtrate obtained cooled down. The excess of epichlorohydrin was then distilled off from the filtrate under reduced pressure. 212 parts of a viscous light yellow polyether product remained as the residue. Such product contained 7.2 weight percent of chlorine, 11.2 weight percent of phosphorus and had a hydroxy number of 304 and an acid number of 3. About 1.5 mol of epichlorohydrin had reacted per g.-atom of phosphorus supplied.

EXAMPLE 5

52.86 parts of aldol were added to:

(a) 7.45 parts of white phosphorus under 80 parts of methanol and the reaction vessel rinsed with nitrogen. The mixture was then heated to about 55° C. and 7.5 parts of NaOH dissolved in 3.4 parts of $H_2O$ and 75 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours. Thereafter the methanol and excess aldol were distilled off, towards the end under vacuum.

(b) The crude product which primarily consisted of the sodium salt of bis-(1,3-dihydroxybutane)-phosphinic acid was then directly heated with 162 parts of epichlorohydrin under reflux while stirring. Sodium chloride separated out during the course of the reaction. After the reaction was completed the sodium chloride was filtered off and the filtrate obtained cooled down. The excess of epichlorohydrin was then distilled off from the filtrate under reduced pressure. 136.2 parts of a viscous polyether product remained as the residue. Such product contained 18.5 weight percent of chlorine, 6.2 weight percent of phosphorus and had a hydroxy number of 430 and an acid number of 6. About 3.5 mol of epichlorohydrin had reacted per g.-atom of phosphorus supplied.

EXAMPLE 6

97 parts of the crude product of Example 4(a) which mainly consisted of the sodium salt of bis-(hydroxybutane)-phosphinic acid were heated together with 185 parts of epichlorohydrin to which 2 parts of NaCl had previously been added while stirring under refluxing conditions. During the course of the reaction further NaCl separated out very quickly. After completion of the reaction the NaCl was filtered off and the filtrate cooled. Thereafter the excess epichlorohydrin was distilled off under vacuum. 239 parts of a light yellow viscous product with a chlorine content of 7.9 weight percent, a phosphorus content of 10.3 weight percent, a hydroxy number of 283 and an acid number of 2.0 were obtained as the residue. About 1.8 mol of epichlorohydrin had reacted per g.-atom of phosphorus in the starting material.

EXAMPLE 7

720 parts by weight of paraformaldehyde were added to 298 parts by weight of white phosphorus under 3700 parts by weight of methanol and the reaction vessel rinsed with nitrogen. The mixture was then warmed to a temperature of about 55° C. and 300 parts by weight of sodium hydroxide dissolved in 136 parts by weight of water and 3100 parts by weight of alcohol slowly added thereto with constant introduction of nitrogen.

The reaction solution was allowed to remain at a temperature of 55° C. for about 3 hours and after cooling was freed of its slight cloudiness by filtration. Then gaseous hydrogen chloride was introduced into the filtrate at 20° C. until no further NaCl precipitated out. About 275 parts by weight of HCl were required therefor. The NaCl was separated from the reaction mixture by filtration. The methanol was removed from the filtrate by distillation, finally under vacuum (12 mm. Hg). 1220 parts by weight of a yellow liquid product remained behind which for the main part consisted of the free bis-(hydroxyalkane)-phosphinic acid.

1840 parts by weight of propylene oxide were added to the total quantity of this reaction product which had been heated to 120° C. while stirring under reflux. After the addition of the propylene oxide was completed the reaction mixture was held at 150° C. for a further 4 hours. Thereafter the volatile components were removed from the reaction mixture by distillation under reduced pressure (12 mm. Hg).

2101 parts by weight of a free hydroxyl group and phosphorus containing polyether remained behind as a yellow viscous product containing 13.3 weight percent of phosphorus and having a neutralization number (acid number) of 5 and a hydroxy number of 360.

What is claimed is:

1. A process for the production of alcoholic hydroxy group and phosphorus-containing polyethers comprising reacting white phosphorus with an alkali metal hydroxide, water, and a lower alkanal in the presence of a lower alkanol at a temperature between about 30 and 75° C., the quantities of alkali metal hydroxide, water and alkanal respectively supplied to the reaction being about 0.75 to 0.85, 0.75 to 0.85 and 2 to 4 mol per g.-atom of white phosphorus to produce a reaction mixture containing a reaction product primarily comprising an alkali metal salt of a bis-(hydroxyalkane)-phosphinic acid to the reaction mixture to convert the alkali metal salt of the phosphinic acid to the free acid, distilling off the more volatile components to leave a product consisting essentially of the free bis-(hydroxyalkane)-phosphinic acid, and reacting said free phosphinic acid with at least one epoxy compound at a temperature between about 30 and 75° C., the quantity of epoxy compound being such as to provide at least 2 mol per g.-atom of phosphorus contained in said free phosphinic acid.

2. The process of claim 1 wherein said epoxy compound is selected from the group consisting of epichlorohydrin, epibromohydrin, ethylene oxide, propylene oxide, styrene oxide and glycidol.

3. The process of claim 1 in which the epoxy compound is epichlorohydrin and the reaction thereof with the phosphinic acid is carried out with 0.5 to 5 parts by weight of NaCl supplied from an external source per 100 parts by weight of the epichlorohydrin.

4. A viscous liquid polyether product containing alcoholic hydroxyl groups and phosphorus obtained by reaction of a bis-(α-hydroxy lower alkane)-phosphinic acid with an epoxy compound selected from the group consisting of epichlorohydrin, epibromohydrin, ethylene oxide, propylene oxide, styrene oxide and glycidol at a temperature between 30 and 75° C., the quantity of epoxy compound being such as to provide at least 2 mol per g.-atom of phosphorus contained in said free phosphinic acid and the polyether.

References Cited

Kindley et al., Chemical Abstracts, vol. 56, 1962, p. 15662f, g.

CHARLES B. PARKER, Primary Examiner

R. L. RAYMOND, Assistant Examiner

U.S. Cl. X.R.

260—77.5, 502.4, 971, 978